March 11, 1969 E. SCHRODER 3,432,169

TAPE CARTRIDGE EJECTING ARRANGEMENT

Filed Feb. 13, 1967 Sheet 1 of 4

Inventor
Erich Schröder
by
Michael S. Striker
Atty

TAPE CARTRIDGE EJECTING ARRANGEMENT

Inventor
Erich Schröder
by
Michael S. Striker
Atty

March 11, 1969 E. SCHRODER 3,432,169

TAPE CARTRIDGE EJECTING ARRANGEMENT

Filed Feb. 13, 1967 Sheet 3 of 4

Inventor
Erich Schröder
by
Michael J. Striker
Atty

Inventor
Erich Schröder
by Michael J. Striker
Atty 3,432,169
Patented Mar. 11, 1969

1

3,432,169

TAPE CARTRIDGE EJECTING ARRANGEMENT

Erich Schroder, Nuremberg, Germany, assignor to Grundig Elektro-Machanische Versuchsanstalt Inh. Max Grundig, Furth, Bavaria, Germany Filed Feb. 13, 1967, Ser. No. 615,795
Claims priority, application Germany, Feb. 12, 1966, G 46,010
U.S. Cl. 274—4 12 Claims
Int. Cl. G11b 5/00, 15/32

ABSTRACT OF THE DISCLOSURE

The tape cartridge of a tape recorder and/or tape player is ejected from the casing of the device by a second actuation of a stop button whose first actuation causes stopping of the tape movement by returning a start button to its position of rest.

*Background of the invention*

The present invention relates to a sound reproducing device with a cartridge with a magnetic tape. Devices of this type have a slot or opening in the casing through which the tape cartridge is inserted. When the cartridge is to be removed, it must be laterally gripped. In order to permit this operation, the opening in the casing of the device must have sufficient width to permit the fingers to enter the opening and to grip the cartridge. It is impossible to perform this operation with gloves as may be required if the device is used in a motor car.

It is also known to provide an ejector for the cartridge which is operated by a special button. It is undesirable to provide additional buttons on the small device, and the construction is complicated.

*Summary of the invention*

It is one object of the invention to provide a cartridge ejecting arrangement which is constructed of few parts, and is easily operated in a motor car or in other difficult situations.

Another object of the invention is to provide a cartridge ejecting arrangement in which a standard button is used for ejecting the cartridge in addition to its normal function.

It is another object of the invention to use the stop button of the device by which the tape movement is stopped, for ejecting the cartridge upon a second actuation.

With these objects in view, an embodiment of the invention comprises ejector means for ejecting a tape cartridge; start means preferably including a start button, movable from a normal position to a starting position for starting movement of the tape; stop means, preferably including a stop button, movable between a normal position, a first operative position for causing stopping of the tape movement, and a second operative position for operating the ejector means to eject the cartridge; blocking means having an inoperative position and a blocking position for blocking movement of the stop means in the first operative position, and being moved to the blocking position by the start means moving to the starting position so that the stop means is blocked in the first operative position when first actuated after movement of the start means to the starting position; and control means operated by the stop means upon return to its normal position to cause movement of the blocking means to the inoperative position.

Consequently, when the stop button of the stop means is actuated a second time while the blocking means is in the inoperative position, the stop means moves to the second operative position whereby the cartridge is ejected.

In the preferred embodiment of the invention, the start means causes stopping of the tape movement when returning from the starting position to the normal position of rest. The start means is locked in the starting position, and released by the stop means returning to its normal position after the first actuation so that the start means also returns to its normal position and stops the tape movement.

It is advantageous to release the holding means of the tape cartridge by the stop means arriving at the second operative position, substantially simultaneously with the operation of the ejector means.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

*Brief description of the drawings*

FIGS. 1*a* and 1*b* illustrate the device in its normal position of rest, FIGS. 2*a* and 2*b* illustrate the device in its normal operating position in which the start button 15 is depressed, FIGS. 3*a* and 3*b* illustrate the device after a first actuation of the stop button 17 which causes return of the start button to its normal position and stopping of the tape, and FIGS. 4*a* and 4*b* illustrate the position of the device after the second actuation of the stop button 17 by which ejection of the carriage is caused.

*Description of a preferred embodiment*

Figure 1B:
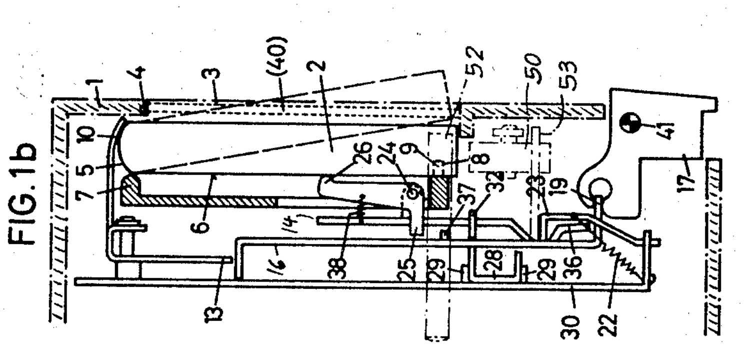
FIGS. 1*b*, 2*b*, 3*b*, and 4*b* are cross-sectional views illustrating, respectively, the operational positions of the device shown in FIGS. 1*a*, 2*a*, 3*a* and 4*a*.

Referring now to the drawing in which only the parts of the sound reproducing device required for the arrangement of the present invention are shown for the sake of clarity, a casing 1 has an opening 3 through which a tape cartridge 2 is inserted into the casing. The inserted cartridge 2 has an upper edge portion covered by a wall portion 4. The outline of the inserted cartridge is indicated in FIGS. 1*a* to 4*a* by a dash and dot line. The cartridge is inserted in a slanted position, shown in FIG. 1*b* in broken lines until its rounded off edge 5 is engaged by a pair of curved holding arms 10, whereupon the cartridge is turned in clockwise direction about its rounded edge 5 into an operative position in which the cartridge abuts three points of fixed supporting members secured to the casing. The upper part of the bottom surface 6 abuts a boss 7 with its central portion, while two recesses 8 near the lower end of the cartridge are engaged by a pair of pins 9.

The rounded off upper edge 5 is engaged by the curved arm 10 of two symmetrically arranged holding levers 13 which are mounted for turning movement about pivots 12. Spring 11 urges the inner arms of holding levers 13 toward each other so that the curved arms 10 are moved to the portion shown in FIGS. 1*a* and 1*b* holding cartridge 2. This position is maintained throughout the use of the tape of the cartridge. Instead of the wide opening 3, a narrower slot may be provided in the front wall of casing 1 for the insertion of the cartridge.

A conventional start button 15, and a conventional stop button 17 are mounted adjacent each other on supporting pivot means 41. The start and stop buttons have cutouts engaging transverse projections 18 and 19 of start and stop members 14 and 16. When one of the buttons is depressed, it turns about pivot 41 and shifts the respective member 14 or 16 in a rectilinear motion. A spring 20 opposes the movement of start member 14, and a spring 27 opposes the movement of stop member 16 out of the normal positions of the buttons.

Figure 1A:
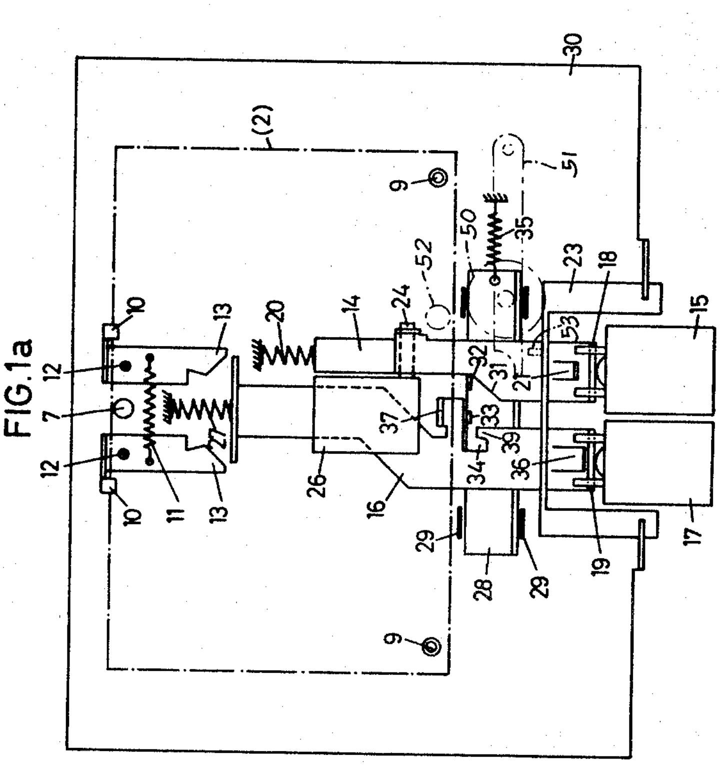
FIGS. 1*a*, 2*a*, 3*a*, and 4*a* are schematic front views of a sound reproducing device provided with the cartridge ejecting arrangement of the present invention, and illustrating consecutive operational positions.
Figure 2B:
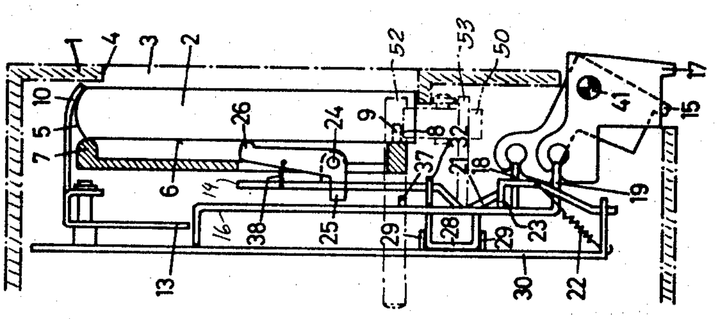
Figure 2A:
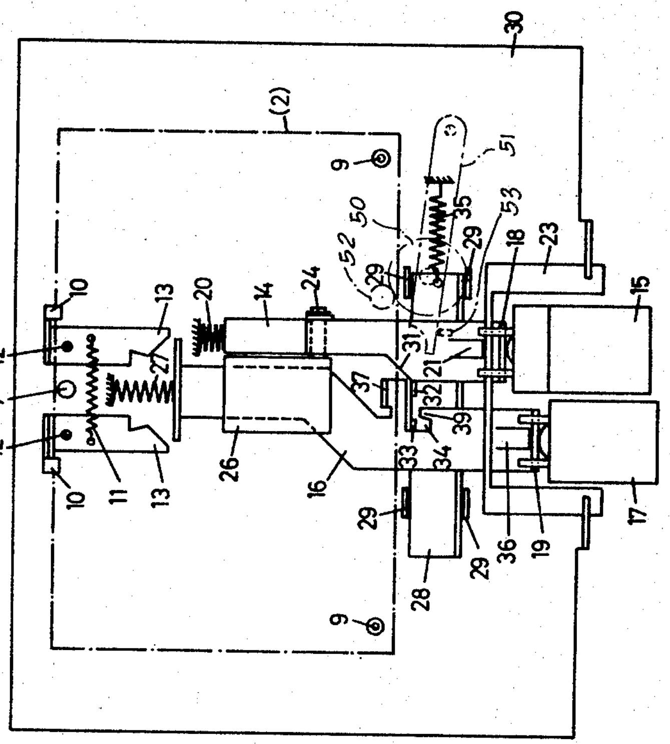

Start member 14 has a transverse locking portion 21 which cooperates with the yoke of a bail 23 which is mounted on the supporting means 30 for turning movement between an inoperative position shown in FIGS. 1*a* and 1*b*, and a locking position shown in FIGS. 2*a* and 2*b* in which the locking portion 21 of start member 14 abuts the yoke of locking bail 23 under the action of spring 20.

Stop member 16 has a slanted transversely projecting releasing portion 36 which engages the yoke of the locking bail 23 to raise the bail for releasing locking portion 21.

An ejector means in the form of an angular lever 26 is mounted on brackets of start member 14 and is urged by a spring 38 to a normal inoperative position shown in FIG. 1*b*. When the stop member 16 is shifted far enough by operation of stop button 17, an actuating projection 37 on stop member 16 engages arm 25 and turns ejector means 26 from the position of FIG. 3*b* to the position of FIG. 4*b* in which the cartridge 2 is engaged and ejected. The ejector means 26 may also be mounted on the supported means of casing 1.

Stop means 17, 16 is used in accordance with the invention for operating the ejector means 26, but in order to perform its normal function of stopping the tape movement, it is not permitted to move to the ejection position, but is stopped by blocking means which are controlled by start means 15, 14.

A blocking slide 28 is mounted between guide means 29 for movement transverse to the direction of the movement of start member 14 and stop member 16. Blocking slide 28 has a projection 32 cooperating with a slanted cam face 31 on start member 14 so that depression of the start button 15 and movement of start member 14 to the starting position causes shifting of blocking slide 28 toward the left as viewed in FIG. 1*a* from the position of FIG. 1*a* to the position of FIG. 2*a*.

When start member 14 arrives in the starting position, the tape movement is started in the conventional manner by operating means, which include a rubber pressure roller 50 or a lever 51 pressing the tape against a rotating drive roller 52 when lever 51 is turned by a projection 53 on start member 14, so that the tape is transported at a constant speed, as required for recording or play back.

In this starting position of the start means 14, 15, locking means 23 is urged by spring 22 to fall behind locking projection 21 and to lock start means 14, 15 during the tape movement, as required.

Figure 3B:
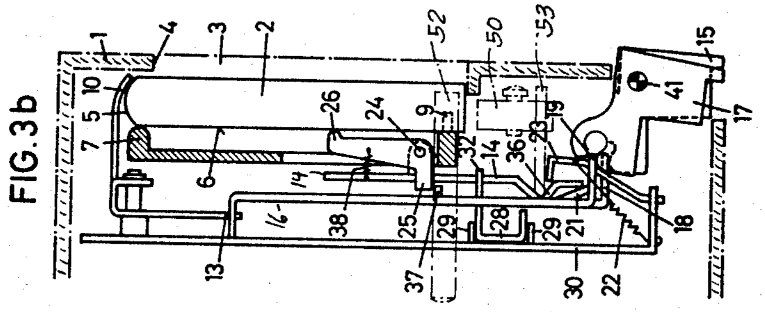
Figure 3A:
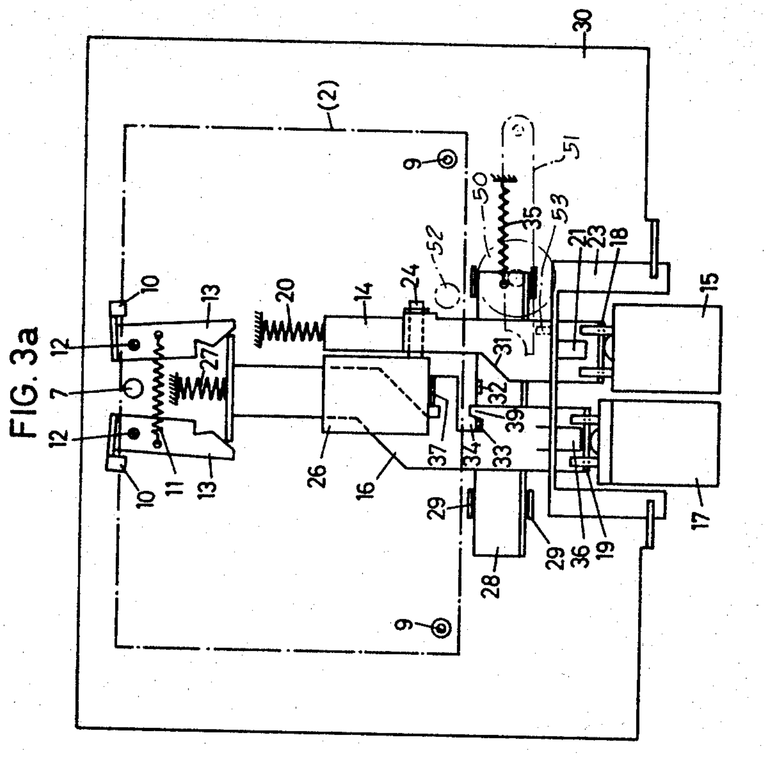

When the tape movement is to be stopped, stop button 17 is operated, and stop member 16 moves to the position shown in FIGS. 3*a* and 3*b*. During such movement, releasing portion 36 of stop member 16 raises locking means 23 so that locking portion 21 is released, and start means 14, 15 returns to its normal position under the action of spring 20. The start means 14, 15 are connected in a conventional manner to the above described operating means, not shown, so that return of the start means to the normal position causes retraction of the pressure roller and stopping of the tape.

The movement of stop member 16 is limited by a projection 33 on blocking slide 28 in the position of FIG. 3*a* and 3*b*. In this first operative position of stop means 16, 17, the tape movement is stopped by return of the start means 14, 15 to the normal position, but actuating projection 37 does not yet engage arm 25 of ejector means 26.

Stop means 16, 17 is not locked in this first operative position, and is returned by spring 27 to its normal position as soon as the operator releases stop button 17. However, while stop member 16 is in the first operative position shown in FIGS. 3*a* and 3*b*, a control stop 39 of stop member 16 laterally bounds the cutout 34 in which locking projection 33 is located, so that blocking slide 28 cannot be returned by spring 35 to its normal position shown in FIG. 1*a*, although projection 32 is released by start member 14 when the same returns to its normal position. When stop button 17 is released by the operator, spring 27 returns stop member 16 to its normal position so that blocking projection 33 is located opposite an open portion of cutout 34, permitting spring 35 to return blocking slide 28 to its normal position shown in FIG. 1*a*.

Figure 4B:
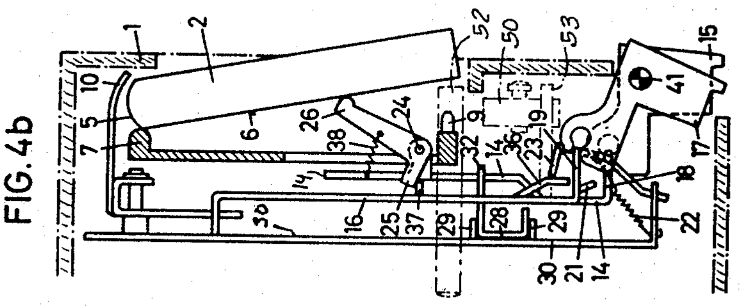
Figure 4A:
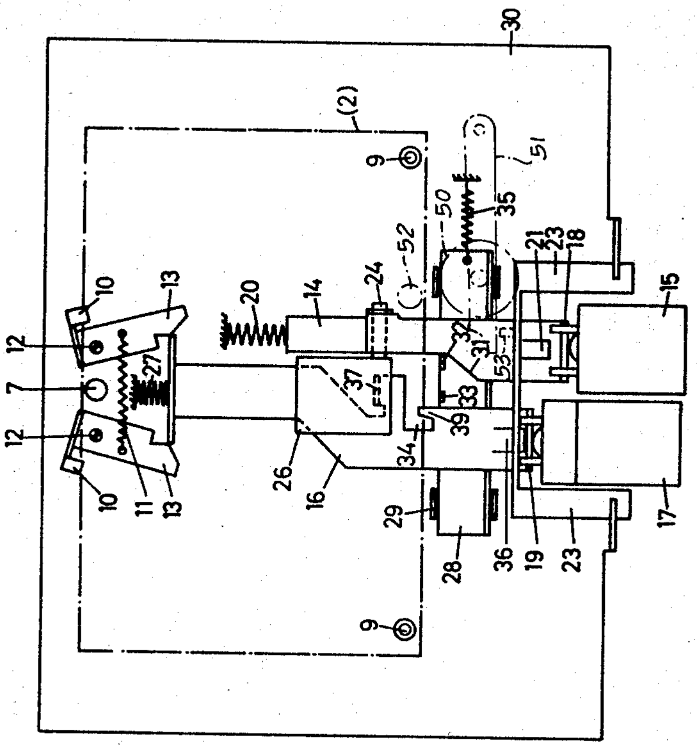

When the operator now depresses stop button 17 a second time, blocking projection 33 cannot block stop member 16 in the first operative position shown in FIG. 3*a*, so that stop member 16 moves to a second operative position in which actuating portion 37 on stop member 16 moves far enough to engage and operate ejector means 25, 26, as shown in FIGS. 4*a* and 4*b*, and the cartridge is pushed out and may turn about the edge 4 of a wall of casing 1.

In this second operative position, a transverse projection on the end of stop member 16 engages slanted faces of holding levers 13 and urges the same apart so that holding levers 13 and holding arms 10 turn to the position of FIG. 4*a* and release the upper edge 5 of cartridge 2. In the position shown in FIG. 4*b*, the lower portion of cartridge 2 can be manually gripped and removed from the casing. A cover plate 40, shown in broken lines in FIG. 1*b*, may be used for closing opening 3.

From the above description of a preferred embodiment of the invention it will become apparent that upon depression of start button 15, the tape movement for play back or recording is started, and takes place as long as locking means 23, 21 lock start member 14. Blocking means 28, 32, 33 is moved to a blocking position.

Upon a first depression of stop button 17, start button 15 is released and returns to its normal position so that tape movement stops while blocking means 28, 32, 33 blocks movement of stop member 16 in the first operative position shown in FIGS. 3*a* and 3*b*. The returning stop means 16, 17 moves control stop 39 so that the blocking means 28, 32, 33 can return to its inoperative position.

When stop button 17 is now actuated a second time, blocking means 28, 32, 33 has already returned to its inoperative position so that stop member 16 can move to its second operative position shown in FIGS. 4*a* and 4*b* in which ejector means 26 is actuated to eject the cartridge.

If after return of both buttons to the normal position, instead of depressing stop button a second time, start button 15 is depressed, tape movement is again started, and blocking means 28, 32, 33 again assumes the blocking position in which stop means 16, 17 is prevented from ejecting the cartridge.

It will be understood that each of the elements described above, or two or more together, may also find a useful application in other types of cartridge ejecting arrangements differing from the types described herein above.

While the invention has been illustrated and described as embodied in a tape player having a stop button whose second actuation causes ejection of a tape cartridge, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a device having means for receiving and holding a tape cartridge, in combination, ejector means for ejecting said cartridge; start means movable from a normal position to a starting position for starting movement of the tape; stop means movable between a normal position, a first operative position for causing stopping of the tape movement, and a second operative position for operating said ejector means to eject said cartridge; blocking means having an inoperative position and a blocking position for blocking movement of said stop means in said first operative position, and being moved to said blocking position by said start means moving to said starting position so that said stop means is blocked in said first operative position when first actuated after movement of said start means to said starting position; and control means operated by said stop means upon return to said normal position thereof to cause movement of said blocking means to said inoperative position so that when said stop means is actuated a second time while said blocking means is in said inoperative position, said stop means moves to said second operative position to operate said ejector means whereby said cartridge is ejected.

2. A device as claimed in claim 1 comprising biasing means for urging said start means and said stop means to said normal positions, and locking means for locking said start means in said starting position; wherein said start means in said normal position stop the tape movement; and wherein said stop means include releasing means for releasing said locking means in said first operative position so that said start means return to said normal position and stop the tape movement.

3. A device as claimed in claim 2 wherein said blocking means includes a blocking slide movable between said inoperative and blocking positions, and spring means urging said blocking slide to said inoperative position; wherein said start means includes a cam surface engaging said blocking slide during movement of said start means to said starting position for moving said blocking slide to said blocking position, and releasing in said normal position said blocking slide; and wherein said stop means has a stop engaging said released blocking slide in said first operative position of said stop means for holding said blocking slide until said stop means has returned to said normal position thereof whereupon said spring means moves said blocking slide to said inoperative position permitting said stop means to move to said second operative position when again actuated before another actuation of said start means.

4. A device as claimed in claim 3 wherein said blocking means has a blocking member; and wherein said stop means has a cutout in which said blocking member is located in said blocking position of said blocking slide, said blocking member blocking said stop means in said first operative position by engaging an edge of said cutout; and wherein said stop of said blocking slide partly bounds said cutout and is engaged by said blocking member abutting said edge so that said blocking slide cannot move to said inoperative position while said stop means is in said first operative position.

5. A device as claimed in claim 1 wherein said stop means has an actuating member spaced from said ejector means in said normal position and said first operative position, and engaging and actuating said ejector means in said second operative position of said stop means.

6. A device as claimed in claim 5 wherein said ejector means includes a pivotally mounted ejector lever having a short arm cooperating with said actuating member and a longer arm cooperating with said cartridge.

7. A device as claimed in claim 1 wherein said device includes a casing having a wall formed with an opening for insertion of said cartridge into a cavity in said casing partly bounded by said wall so that a portion of the inserted cartridge is located behind a portion of said wall, said portion having an edge serving as a fulcrum on which said cartridge turns during ejection by said ejector means.

8. A device as claimed in claim 1 wherein said device includes a casing having an opening for the insertion of said cartridge into said casing, and holding means in said cavity for holding the inserted cartridge; and wherein said stop means includes an engaging means engaging said holding means in said second operative position of said stop means and operating said holding means to release said cartridge for movement out of said casing by said ejector means.

9. A device as claimed in claim 8 wherein said holding means includes a pair of holding members, and spring means biassing said holding members to resiliently engage and hold the inserted cartridge, and wherein said engaging means engages said holding members in said second operative position of said stop means for moving the same against the action of said spring means to a position releasing said cartridge.

10. A device as claimed in claim 9 wherein said holding members are holding levers having curved arms embracing an edge of said cartridge; including pivot means supporting said holding levers, and wherein said spring means connects other arms of said holding levers to turn the same toward each other to a holding position in which said curved arms embrace said edge of said cartridge.

11. A device as claimed in claim 1 comprising a casing having supporting means; wherein said start means includes a start button movably mounted on said supporting means, and a start member connected with said start button for movement, and mounted on said supporting means for rectilinear movement to and from said starting position, said start member having a slanted cam face; wherein said stop means include a stop button movably mounted on said supporting means, and a stop member connected with said stop button for movement, and mounted on said supporting means for rectilinear movement between said normal position and said first and second operative positions; wherein said control means include a spring biassed locking mean for locking said start member in said starting position, and being released by said stop member moving to said first operative position so that said start member returns to its normal position, said start member in said normal position stopping tape movement; and wherein said blocking means include a blocking slide engaged by said slanted cam face and moved to said blocking position during movement of said start member to said starting position for blocking movement of said stop member in said first operative position, said blocking slide releasing said stop member upon return of said start and stop members to said normal positions so that said stop member can be moved by a second actuation to said second operative position for ejecting said cartridge.

12. A device as claimed in claim 11 comprising resilient holding means mounted on said supporting means for resiliently holding a cartridge inserted into said casing; wherein said stop member in said second operative position engages and releases said holding means while operating said ejector means to eject said cartridge.

References Cited

UNITED STATES PATENTS

| | | |
|---|---|---|
| 3,319,483 | 5/1967 | Ratter et al. |
| 2,864,611 | 12/1958 | Gray. |

FOREIGN PATENTS

| | | |
|---|---|---|
| 1,128,165 | 1962 | Germany. |

LEONARD FORMAN, *Primary Examiner.*

R. A. FIELDS, *Assistant Examiner.*

U.S. Cl. X.R.

179—100.2; 242—55.13